United States Patent [19]

Batham

[11] 4,323,843
[45] Apr. 6, 1982

[54] MAGNETIC CONTAMINATION DETECTOR

[76] Inventor: Ian N. Batham, Diery St., Warwick, Queensland 4370, Australia

[21] Appl. No.: 98,842

[22] Filed: Nov. 30, 1979

[30] Foreign Application Priority Data

Dec. 6, 1978 [AU] Australia .............................. PD7019

[51] Int. Cl.³ ...................... G01N 27/74; G01R 33/12
[52] U.S. Cl. .................................. 324/204; 324/65 R; 200/61.09; 335/305; 340/631
[58] Field of Search ............ 324/204, 219, 228, 65 R; 200/61.09; 340/627, 631; 335/305, 306

[56] References Cited

U.S. PATENT DOCUMENTS

| | | | |
|---|---|---|---|
| 2,429,920 | 10/1947 | Bourne, Jr. .......................... | 340/631 |
| 2,450,630 | 10/1948 | Bourne, Jr. ....................... | 200/61.09 |
| 2,754,380 | 7/1956 | Meile . | |
| 2,936,890 | 5/1960 | Botstiber .......................... | 335/305 X |
| 3,067,366 | 12/1962 | Hofman ......................... | 335/306 X |
| 3,404,337 | 10/1968 | Pool et al. ..................... | 324/204 |
| 3,432,750 | 3/1969 | Botstiber ..................... | 200/61.09 X |
| 3,457,504 | 7/1969 | Arthur et al. . | |
| 3,553,672 | 6/1971 | Smith ................................. | 340/627 |
| 3,748,576 | 7/1973 | Sigournay . | |
| 4,070,660 | 1/1978 | Tauber . | |
| 4,100,491 | 7/1978 | Newman, Jr. et al. . | |

*Primary Examiner*—Stanley T. Krawczewicz
*Attorney, Agent, or Firm*—Le Blanc, Nolan, Shur & Nies

[57] ABSTRACT

Apparatus is provided for detecting ferrous contamination in a fluid such as engine transmission lubricant. The apparatus has two spaced apart electrodes, a magnetic flux extending between the electrodes the lines of force of which are substantially rectilinear, the electrodes being connectable to a circuit for signalling when an electrically conductive path is formed from one electrode to the other by metal particles attracted to the flux and formed into an electrode spanning bridge. For preference the sensor is a hollow plug, which in use is screwed into a transmission housing port, and has a flat end wall in contact with the lubricant in the housing. The plug contains a magnet having both poles disposed towards the plug end wall, a portion of the end wall acting as one electrode. A ferromagnetic disc mounted externally from the plug end wall, and electrically insulated therefrom, overlies the poles. The disc acts as a second electrode and serves to direct the magnetic flux rectilinearly across the gap between the electrodes. The electrodes are connectable to circuit means whereby a change in interelectrode resistance may be detected.

19 Claims, 5 Drawing Figures

MAGNETIC CONTAMINATION DETECTOR

BACKGROUND OF THE INVENTION

1. Field of the Invention

This invention relates to means for detecting magnetisible electrically conductive particles in a fluid medium and is of particular use for detecting metal particles in the lubricant of an engine or a mechanical transmission system thus to give warning of malfunction of the system.

Preferred embodiments of apparatus according to the invention not only detect metal particles but also provide a measure of the concentration of such particles.

The invention will hereinafter be described with particular reference to its use as a warning apparatus for detecting contamination in the lubricant of the transmissions used in heavy agricultural and earth moving equipment to transmit mechanical energy from the engine or motor to wheels or to other means to be driven. However, it will be understood that the invention is not limited to applications involving vehicle transmission systems, or to detection of metal contamination in lubricants.

Transmissions normally utilized in heavy machinery either use gears which are encased in a gear box or utilize hydraulic rams which are housed in an appropriate housing. Gear boxes are lubricated by an appropriate lubricating fluid such as a mineral oil which is usually contained in a reservoir in the base portion of the gear box. In hydraulic transmissions there is a fluid reservoir which acts as the fluid source and there can be gearing mechanisms involved in operation of a hydraulic fluid pump.

When, for example, gearing teeth of a gear box are reaching a worn stage and or not meshing in the manner for which they are designed, flakes or particles of metal are passed into the lubricating fluid or hydraulic fluid and thereby normally travel to the fluid reservoir. After a period of time these metal particles build up in the fluid reservoir and this is normally recognized to be indicative that appropriate repairs should be initiated to the transmission. If the symptoms are not recognized at an early stage, and repairs are not effected, then damage can subsequently be caused which is extremely expensive to repair and which may require replacement of major components, or may even require the substitution of a new gear box or of a new transmission. Moreover, if appropriate repairs are not effected at an early stage the motor or engine may be adversely affected in addition to the transmission system. On the other hand, if the build-up of metal particles in the fluid reservoir is recognized at an early stage, corrective repairs may be undertaken which are usually relatively far less costly.

Particularly in the case of heavy earth moving or agricultural equipment in which the driver of the vehicle may be housed in a soundproof cabin the driver may not hear sounds coming from the transmission which are also normally indicative of faults such as worn out gear teeth or misalignments which result in the deposition of metal particles in the fluid reservoir. As a result he may run the transmission to a point which will result in major damage to the transmission and often to the engine of the vehicle.

Similarly with engine and transmission bearings it is normal for very fine particles of metal to be deposited from the bearing metals into the lubricant. However, an excessive rate of such deposition is an early indication of impending bearing failure. Particles of the type originating from wear of bearings are typically of a much smaller size than the particles and flakes oringinating from the wear of gears.

2. Description of the Prior Art

A magnetic chip guage is described in U.S. Pat. No. 3,373,352. It comprises a magnet sheathed by a wire coil of which adjacent portions of successive turns may be short circuited by ferrous particles attracted by the magnet. Circuit means are provided to detect changes in the resistance exhibited between the ends of the coil.

A major disadvantage of such detectors is that the sensitivity of the apparatus is dependent on where particles impinge on the coil to cause a short circuit. If two adjacent turns are short circuited by a metal chip, a second chip impinging adjacent the first and effectively shorting the same two turns has a small effect on the resistance of the coil in comparison with an identical chip impinging elsewhere on the coil to short circuit two different turns.

Moreover, since the magnetic field is non uniform and is concentrated at or near one end of the coil, particles tend to accumulate preferentially in a small region along the coil axial direction. That is to say in a manner providing the least sensitivity. While it might be expected that the sensitivity could be improved by extending the coil axially to provide a large number of turns in relation to coil circumference, in practice that merely aggravates the problem created by the tendancy of particles to concentrate at one end and reduces sensitivity by virtue of accumulation of most particles over a few turns of a longer coil.

In other devices for example those proposed in U.S. Pat. No. 2,462,715 and U.S. Pat. No. 4,008,464, metal particles attracted themselves are used to close a normally open circuit between two electrodes of which one is electrically insulated from the other.

U.S. Pat. No. 2,462,715 is particularly directed for use in aircraft engines and relates to a metal plug which may be screwed into a port opening into a part of an aircraft engine. It is characterized as having two bar magnets projecting as fingers upwardly from one end of the plug into the engine, one magnet having a north pole and the other a south pole both pole faces being substantially coplanar and in contact with the lubricant fluid. The magnets are spaced apart, and electrically insulated, one from the other. In use, metal particles in the fluid attracted to one or the other magnetic pole eventually form a bridge spanning the magnetic poles and providing a conductive path which closes a normally open circuit to light a warning light.

U.S. Pat. No. 4,008,464 describes a plug in which an insulated support member projects into the lubricant. Two annular magnets sleeve the support. The magnets are spaced apart in the fluid and when a bridge of metal particles spans from one magnet to the other, a normally open circuit between electrodes positioned adjacent each magnet is closed.

The prior art detectors suffer from a number of disadvantages.

Firstly, the detectors are not as sensitive as is desirable, that is to say the threshold quantity of metal required to trigger a warning is too high and consequently the detectors often fail to give a positive warning at a sufficiently early time during the development of a fault condition, at which time preventative repair could be undertaken at relatively low expense. In fact during the period in which metal particles are building up in the lubricant and prior to such devices giving a warning the presence of metal particles may itself be deleterious to the transmission system. For reasons which will later be apparent, the sensitivity of those detectors is, in practice inherently limited.

Secondly the quantity of metal required to trigger a warning tends to be that non reproducible, that is to say a quantity which will trigger alarm system in one experiment will not trigger an alarm in a second experiment. Efforts to increase the sensitivity of those devices have been found adversely to affect reproducibility.

Thirdly, the detectors only distinguish between a condition in which there are insufficient metal particles to bridge the electrode gap and a condition in which the gap is bridged. The detectors do not provide an indication of the concentration of particles or the rate of build-up of particles, both of which are important diagnostic aids.

Because of the above disadvantages prior art detectors have been limited in use to the detecting comparatively large metal fragments and have generally not been of use to detect, for example, excessive wear of bearings.

BRIEF SUMMARY OF THE INVENTION

A third disadvantage in the case of at least some transmissions systems, for example those typical of heavy agricultural and earth moving equipment, is a real danger that the outwardly projecting fingers or magnet bearing members may contact gear teeth or other components of the transmission system located within the transmission housing causing damage or being damaged. Moreover, the magnets of such systems are exposed to the transmission housing and to components in which an induced magnetic flux may be provided which further detracts from the inherent insensitivity of those devices by causing metal particles to be attracted to the housing or component rather than to the detector.

In addition, the magnets in both cases are necessarily exposed to the lubricant. The tendency of the lubricant to become heated acts to weaken the magnetic field of the magnets over a period of time.

The present invention stems from the discovery that in apparatus of the kind under discussion, certain arrangements of a magnetic flux extending between the electrodes result in a detector of a much superior sensitivity. It has been found that by employing such arrangements, the conductivity of metal bridging between the electrodes correlates sufficiently reproducibly with the concentration of metal particles present in the lubricant to provide a useful measure of the contamination of the lubricant. Preferred embodiments according to the present invention are able to detect the deposition of less than 0.002 grams of metal particles of less than 200 mesh size.

According to one aspect, the invention consists in apparatus for detecting magnetisible electrically conductive particles in a fluid medium, of the type comprising sensor means producing a magnetic flux in a flux path extending between two spaced apart electrodes electrically insulated one from the other, and circuit means for signalling a condition in which an electrically conductive path is formed from one said electrode to the other, characterized in that the lines of force of said flux in said path extend substantially rectilinearly from one electrode to the other.

According to a second aspect, the invention consists in apparatus according to the first aspect, further characterized by ferro-magnetic means for directing substantially the balance of said flux in a looped path said balance being substantially confined within said ferromagnetic means, thereby substantially to prevent non-rectilinear portions of said flux from exerting an influence on magnetisible particles, if any, arranged between said electrodes.

According to a third aspect, the invention consists in an apparatus according to the first or second aspect further comprising an non-magnetic, non-electrically conductive, solid substance extending from one said electrode to the other and occupying a volume of said flux path, whereby in use of said apparatus to deny access by magnitisible particles to said volume. In use of preferred embodiments of the invention, magnetisible particles attracted to the rectilinear magnetic magnetic flux path between the electrodes align themselves along the lines of force. Photomicrographs have shown that such particles extend in a substantially straight bridge from one electrode to the other. This contrasts with prior art detectors wherein lines of force of the magnetic field extend from one electrode to the other through the lubricant in a difuse pattern of curved lines. In that case the particles apparently form a curved bridge extending from one electrode to the other. It would appear that the radius of curvature of the bridge depends on factors such as the distance between the magnetic poles and the field strength which affect the shape of the lines of force, and the weight and size of particles in the bridge giving rise to variability in the quantity of metal required to form a bridge which triggers the alarm circuit.

Secondly, accordingly to the preferred embodiment of the present invention, the magnetic flux between the electrodes which is accessible to magnetisible particles is confined to a path of small cross-sectional area and, except between the electrodes, is substantially confined within a ferromagnetic yoke. Metal particles attracted to the flux therefore tend to be concentrated in the path of small cross-section between the electrodes and almost all particles attracted contribute to the establishment of a bridge of particles spanning between the electrodes. In case of prior art devices, metal particles tend to be attracted to one or other of the magnetic poles and to have a random distribution over the surface of each pole face and in the vicinity thereof. A relatively small fraction of particles attracted to each pole form part of the conductive path of the bridge which eventually forms from one pole to the other. This adversely affects both the sensitivity and reproducibility of those devices.

In preferred embodiments of the present invention, presumably because substantially all particles attracted to the flux between the electrodes participate in the bridge which forms therebetween, measurement of the electrical conductivity (or resistance) of the bridge provides a correlation with the concentration of particles in the fluid.

By combining the detector with circuit means which not only detect the establishment of a conductive bridge between the electrodes but which also detect changes in the electrical impedance of a bridge once established, it is possible to obtain an indication both of the quantity of metal particles present and the rate of their accretion.

This is in contrast with prior art devices in which the circuit means merely provide an indication that a threshold current through the metal particle bridge is exceeded. Since with those devices the current is of a magnitude which does not correlate well with the quantity of metal and is relatively non reproducible, no purpose is served by supplying a circuit sensitive to changes in conductivity.

BRIEF DESCRIPTION OF THE DRAWINGS

An embodiment of the invention will now be described with reference to the accompanying drawings in which.

DETAILED DESCRIPTION OF PREFERRED EMBODIMENTS

Figure 1:
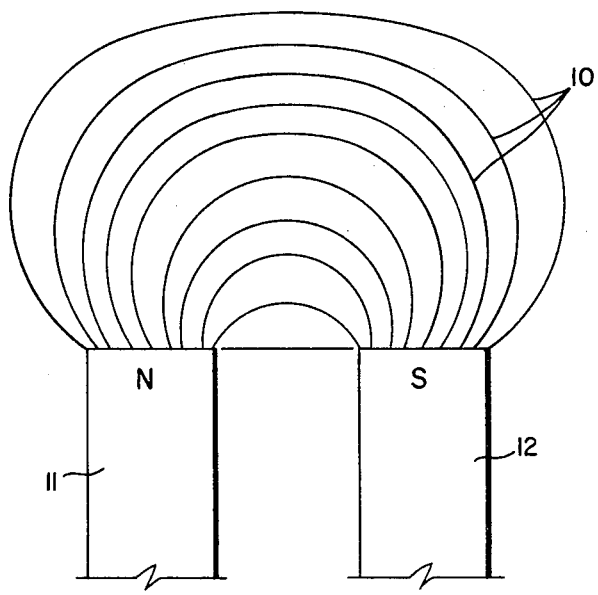
FIG. 1 is a schematic drawing showing the lines of force typical of the diffuse magnetic field of prior art devices.

With reference to FIG. 1 there is illustrated the lines of force 10 extending between two spaced apart magnets 11 and 12 such as are typical of prior art sensors of the type under discussion. Magnets 11 and 12 may be bar magnets or annular magnets.

Figure 2:
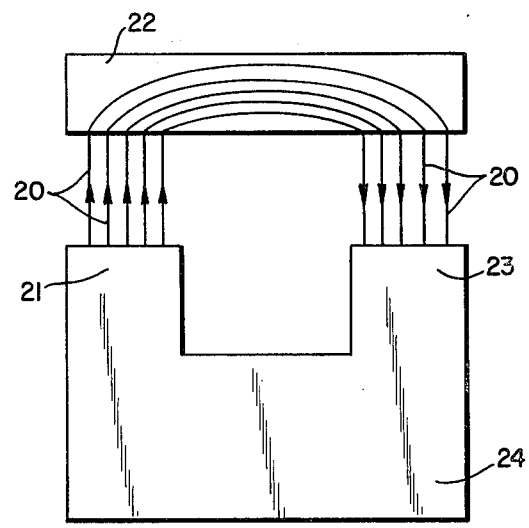
FIG. 2 is a schematic drawing showing the lines of force of the magnetic field of a first embodiment of the present invention.

In FIG. 2 there is shown an example of an arrangement of magnetic field in accordance with the present invention comprising magnetic lines of force 20 directed from a pole 21 of a magnetic core 24 rectilinearly to a ferromagnetic body 22, along and within the ferromagnetic body 22, and rectilinearly from the body 22 to a pole 23 of opposite polarity from that of pole 21. In the illustrated example, the magnetic loop is completed from pole 23 to pole 21 within the ferromagnetic core 24. Electrodes, spaced apart in the field direction and electrically insulated one from the other, not shown in FIG. 2, may be spaced apart in the field direction in the rectilinear field extending for example between the pole face 21 and ferromagnetic body 22, or the magnetic core and the body 22 may each be used as one electrode.

Figure 3:
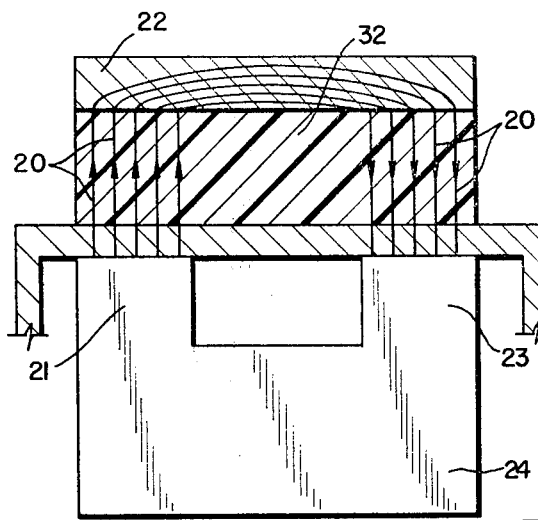
FIG. 3 is a schematic drawing illustrating the principle of operation of a preferred second embodiment according to the present invention.

With reference to FIG. 3 there is shown an example of the principle of operation of a preferred embodiment according to the invention. In this example, numerals 20 to 24 identify parts corresponding to those of FIG. 2. In addition there is shown a part of a non-ferromagnetic, electrically conductive, casing 30 which houses the magnetic core 24 and through which magnetic flux 20 extends rectilinearly. Casing 30 and ferromagnetic body 22 act as electrodes and are connected by means not illustrated in FIG. 3 to a circuit. A non-magnetic, non-electrically conductive spacer 32 spaces ferromagnetic body 22 from casing 30. In the example illustrated body 22 overlies poles 21 and 23, spacer 32 occupying part of the rectilinear field path between pole 21 and body 22 thereby confining access by particles to the remainder of the rectilinear flux path which has a small cross-sectional area in comparison to the cross-sectional area of the flux path as a whole.

Figure 4:
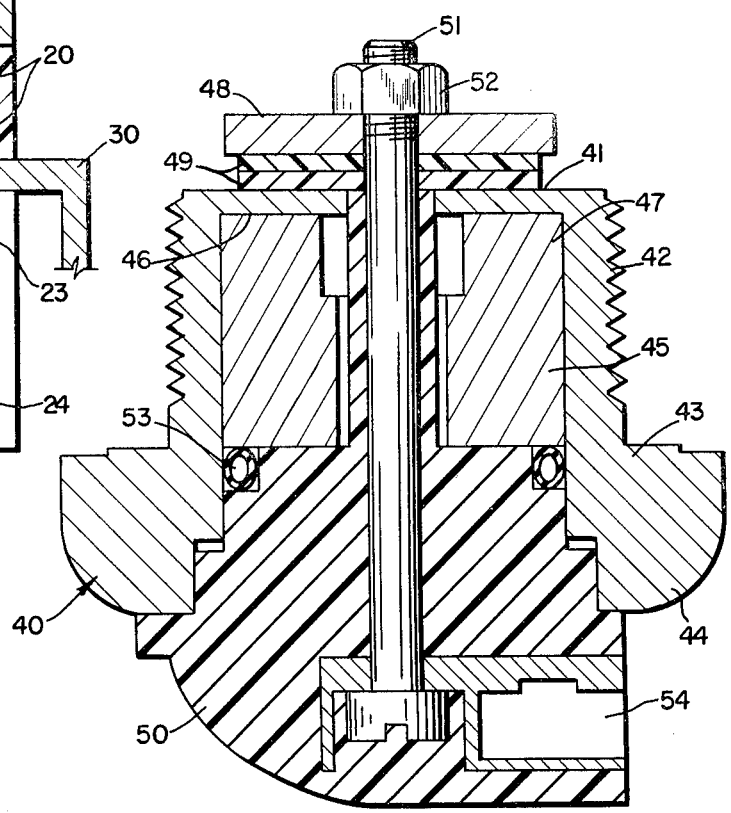
FIG. 4 shows a cross-section of a sensor means according to the present invention.

With reference to FIG. 4 there is illustrated a preferred embodiment of sensor means according to the invention. The embodiment comprises a plug 40 of generally cylindrical shape having a hollow interior, a stub end wall 41, the plug being adapted, in use, to be inserted into a threaded port of a transmission housing by means of screw threads 42 on the exterior cylindrical portion. Plug 40 has a flanged base portion 43 adapted to contact with the exterior of the transmission housings when threaded portion 42 has been screwed into its mating port. The base portion desirably has flats 44 in the manner of a nut to facilitate screwing of the plug into a port. At least stub end wall 41 is of an electrically conductive non-magnetic material and in the present example, plug 40 including stub wall 41 is of brass.

Housed within plug 40 is a permanent magnet core 45 of a ferromagnetic material which is generally cylindrical in shape having a bore extending axially therethrough and having two "D" shaped pole faces 46 and 47, each of opposite polarity to the other. Pole faces 46 and 47 are disposed adjacent the interior of stub end wall 41.

Overlying pole faces 46 and 47, and of substantially the same diameter as cylindrical magnetic 45, is a disc 48 made of a ferromagnetic, electrically conductive, metal for example steel, and pierced by a hole at its centre. Disc 48 is substantially parallel to and spaced apart from stub wall 41 by one or more spacer discs 49. In the illustration of FIG. 4 two such discs are employed. Each is of a non-magnetic, non-conductive material and in the present example, is a plastics material. Discs 49 are also pierced by a hole at their centre. Desirably discs 49 are of slightly smaller diameter than the ferromagnetic disc 48 whereby disc 48 overhangs discs 49.

A connector assembly 50 to be described in more detail hereinafter is adapter for insertion at the base of the plug. The connector assembly 50 includes a bolt 51 which passes from connector assembly 50 axially through the plug, through the bore of magnetic 45, through the aperture of end wall 41, through the hole of non-conductive discs 49 and of ferromagnetic disc 48, those components being held partly in place by a nut 52 preferably of a self-locking type. Nut 52 and bolt 51 are of non-magnetic, electrically conductive, material such as brass.

When nut 52 is tightened the connector assembly 50 bears against an O-ring 53 which acts as a secondary oil seal and which in turn bears against magnet 45 and holding the components in fixed assembly. The connector assembly 50 is of an electrically insulating material such as bakalite and has connector means 54 for receiving a plug (not shown) the connector being in electrical connection via bolt 51 with disc 48. The aperture through stub wall 41 and through magnet 45 is of larger diameter than bolt 51 so that plug 40 is electrically insulated therefrom. Additional insulation means sleeving bolt 51 may be provided to insure such insulation from wall 41 and magnet 45, if required.

In use, the plug is screwed into a port of a transmission housing providing a seal therewith to prevent escape of lubricant and having end wall 41 in contact with the lubricant. Since the magnetic core is shielded by the plug from the housing and since the magnetic flux path is substantially confined within ferromagnetic materials 48 or 45 except in the space between disc 48 and poles 46 and 47, the lines of force of magnetic flux extend substantially rectilinearly between the magnet and the disc. However, only the portion of that flux lying between end wall 41 and the overhang of disc 48 projecting beyond discs 49 is accessible to magnetisible particles which are prevented by discs 49 from penetrating to a significant extent into the flux path. Magnetisible particles in the vicinity are attracted to the flux at the portion of the magnetic flux adjacent each magnet pole which is accessible, that is to say, not covered by disc 49, or at the overhand of disc 48 which acts as an induced magnetic pole.

The flux within disc 48 is substantially confined, so that particles arriving for example, on the outwardly exposed surface of disc 48 tend to be attracted to the exposed flux portion between disc 48 and end wall 41. Further particles arriving add to those already held adjacent a pole or induced magnetic pole to form a bridge spanning between disc 48 and end wall 41 which act as electrodes. The particles of the bridge align within the field forming a substantially linear bridge of narrow cross-section. Since the bridge is straight the volume of small metal particles required to span the gap between the electrodes is not as sensitive to variation in the magnetic field strength or to particle size and weight as with prior art devices. Moreover almost all particles attracted contribute to the bridge.

The spacers 49 serve not only to space disc 48 from the plug body and to electrically insulated therefrom but act as an oil seal to prevent escape of lubricant from the transmission to the interior of the plug housing of the magnet. The number and thickness of spacers may be varied in order to produce a desired degree of sensitivity in a particular environment. It will be understood that many other arrangements may be employed whereby a linear field is established between the electrodes. For example, a C-shaped magnet having facing parallel pole faces can be employed to provide a rectilinear magnetic field therebetween. In that case at least one electrode electrically insulated from the magnet would be required to be placed in or contiguous with the flux of the ferromagnetic gap and a pole face could be used as the other electrode. Similarly, two bar magnets disposed with unlike poles parallel and facing each other could be employed. The embodiment described with reference to FIG. 4 has the advantage of having a particularly low profile which enables its use in a transmission housing without penetrating into the space contained within the housing to any significant degree. It has been found in all magnet arrangements according to the invention to be highly desirable that the gap between pole faces be partially filled by a non-ferromagnetic non-conductive material so that particles attracted to either pole and forming a bridge between two electrodes are constrained to do so in a path of narrow cross-section. It will be appreciated that the magnetic poles 46 and 47 of the embodiment shown in FIG. 4 could belong to two separate magnets rather than to a single magnetic core and also that the pole faces may be of other shapes, for example, portions of an annulus. Disc 49 may be of the same diameter as disc 48 and in that case the edge of disc 49 serves as an electrode. Disc 48 need not be of the same diameter as magnet 45 although that is preferable.

Table 1 shows the electrical resistance at trigger of a number of detectors according to the embodiment shown in FIG. 4 and shows the mass of particles adhering to the detector at the point at which the resistance first drops from infinity to the range 10 k to 400 k ohms. Table 2 shows the mass of particles adhering to the detector when the resistance has dropped into the range of 100 to 5000 ohms. The correlation between electrical resistance and mass of particle deposits is quite good and is at an optimum when the gap is approximately 0.7 millimeters.

TABLE 1

MASS OF PARTICLES REQUIRED TO TRIGGER DETECTOR.

PARTICLE SIZE: < 200 MESH TO B.S.
TEST FLUID: 5 GMS OF PARTICLES IN 500ML HYPOY C85w/140
NUMBER OF SPACERS 0.7mm thick.

| DETECTOR | 1 MASS OF PARTICLE GMS | 1 RESISTANCE AT TRIGGER OHMS | 2 MASS OF PARTICLE GMS | 2 RESISTANCE AT TRIGGER OHMS | 3 MASS OF PARTICLE GMS | 3 RESISTANCE AT TRIGGER OHMS |
|---|---|---|---|---|---|---|
| A | .0014 | 50K | .0012 | — | .0011 | 110K |
| B | .0012 | 65K | .0017 | — | .0009 | 350K |
| C | — | — | .0015 | 60K | .0022 | 50K |
| D | .0003 | 30K | .0019 | 100K | .0020 | 120K |
| E | — | — | .0003 | 290K | .0024 | 320K |
| F | .0012 | 60K | .0019 | 230K | .0017 | 200K |
| PARTICLE SIZE | 200 < > 100 MESH TO B.S. | | | | | |
| A | .0005 | 10K | .0003 | 3200 | .0022 | 90K |
| B | .0023 | 1300 | .0010 | 40K | .0016 | 50K |
| C | .0014 | 2300 | .0004 | 110K | .0029 | 100K |
| D | .0007 | 6000 | .0003 | 6000 | .0012 | 400K |
| E | .0004 | 30K | .0006 | 16K | .0024 | 140K |
| F | .0005 | 20K | .0017 | 60K | .0048 | 30K |

TABLE 2

RESISTANCE VS. MASS OF PARTICLES

TEST FLUID: 5 GMS OF PARTICLES IN 500ML. HYPOY C85w/140
PARTICLE SIZE: 200 < < 100 MESH TO B.S.
NUMBER OF SPACERS 0.70mm thick

| DETECTOR | 1 RESISTANCE AT TRIGGER OHMS | 1 MASS OF PARTICLES GMS | 2 RESISTANCE AT TRIGGER OHMS | 2 MASS OF PARTICLES GMS | 3 RESISTANCE AT TRIGGER OHMS | 3 MASS OF PARTICLES GMS |
|---|---|---|---|---|---|---|
| A | 650 | .0027 | 2400 | .0075 | 3200 | .0097 |
| B | 1900 | .0027 | 1300 | .0107 | 1700 | .0127 |
| C | 4000 | .0014 | 700 | .0145 | 1000 | .0148 |
| D | 750 | .0052 | 380 | .0188 | 600 | .0134 |

TABLE 2-continued
RESISTANCE VS. MASS OF PARTICLES

| | | | | | | |
|---|---|---|---|---|---|---|
| E | 420 | .0103 | 2000 | .0054 | 1400 | .0138 |
| F | 1220 | .0072 | 900 | .0132 | 400 | .0368 |

Because of environmental factors, for example the type of lubricant, which may affect the resistance exhibited at trigger the circuit, means for use with the detector are preferably of a type which do not indicate the resistance in ohms but which classify the resistance according to one of a number of a resistance ranges. A circuit devised for this purpose is shown in FIG. 5.

Figure 5:
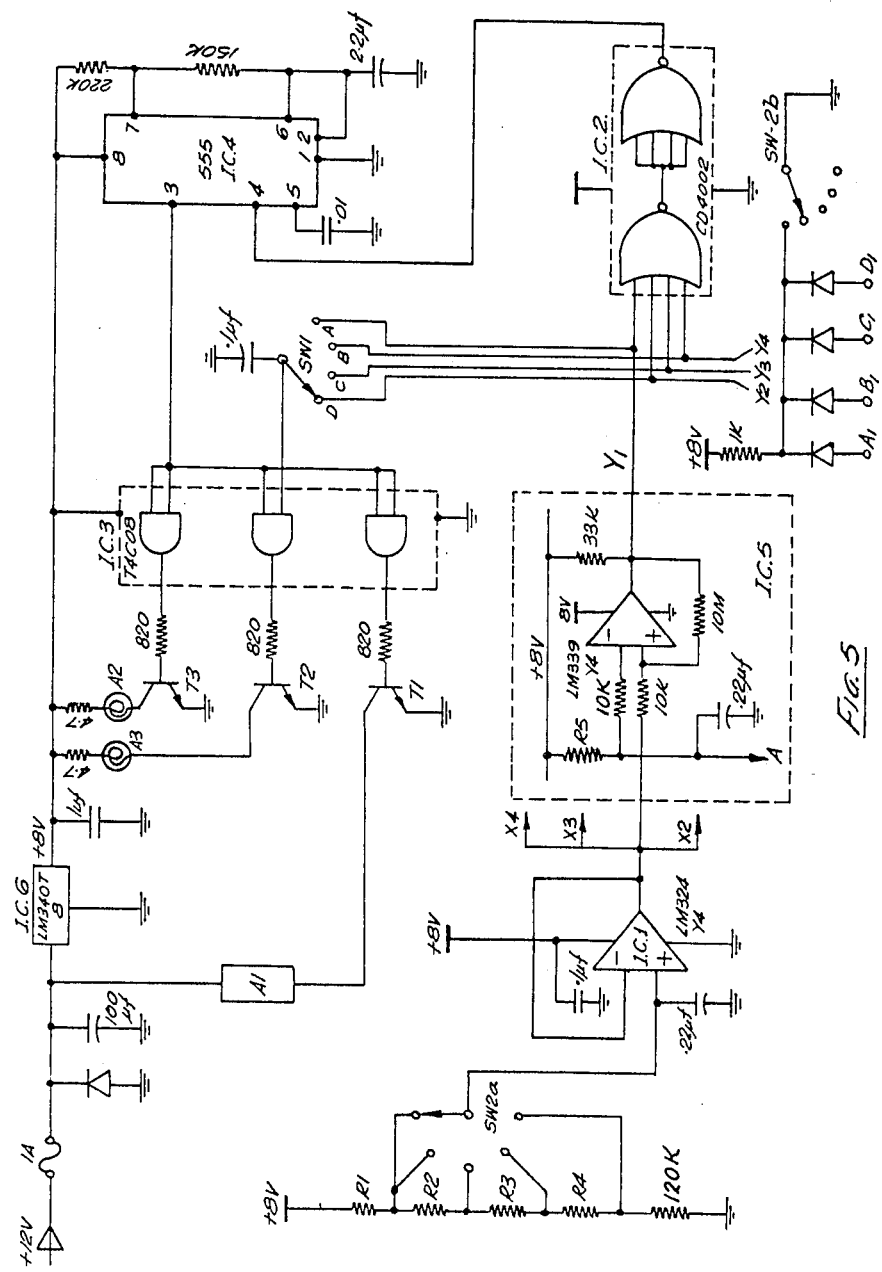
FIG. 5 shows the circuit of circuit means useful for connection to the sensor of FIG. 4.

The circuit of FIG. 5 operates to trigger an alarm when any one of four detectors of the type previously described, and mounted for example at different engine or transmission locations, is electrically connected into the circuit and has a resistance which is less than a switch selectable predetermined threshold value.

The alarm takes the form of a "monitor alert" indicator which flashes in synchronism with an audible alarm at approximately 1 Hz.

A detector select switch then allows each detector to be scanned sequentially on a flashing "monitor select" indicator.

The circuit of FIG. 5 provides a switch selectable sensitivity control. Four pre-set values are provided giving a range of sensitivity from a higher sensitivity which registers a build up of fine powder like particles which are consistent with normal wear, to a low sensitivity which registers large metal chips which is abnormal. If a particular detector registers in the low sensitivity range, or if after cleaning of a detector, the too short an period elapses before the circuit registers in the high sensitivity range, or if having registered in the high sensitivity range too short a period elapses before the circuit registers in the next less sensitive range, excessive wear or damage is indicated.

The circuit of FIG. 5 also provides an overriding test facility which allows the operator to test the continuity of the connections to each detector and the correct functioning of the monitoring system.

The circuit of FIG. 5 comprises a quad comparator circuit, IC-5, having four comparators each of which allows one detector to be monitored. Only the first comparator circuit of IC-5 is shown in FIG. 5. In the comparator of IC-5 shown in FIG. 5 point A is connected to one electrode of a detector the other electrode of the detector being connected to earth potential.

Second, third and fourth comparators (not shown in FIG. 5) of IC-5 are connected in like manner to the comparator shown but respectively between points X2 and Y2; X3 and Y3 and X4 and Y4.

Each of the second, third and fourth comparators is connected to a respective second, third and fourth detector in like manner to the first quad comparator. Each comparator of IC-5 compares the voltage between the detector electrodes with the output of IC-1 which is the buffered output of a switch selectable reference voltage, provided by sensitivity switch SW-2a. The buffered reference voltage is derived from the resistance ladder network comprising resistors R1, R2, R3, R4 which in the present example are 6, 12, 5 and 1 thousand ohms respectively, and are 2% tolerance components, and the reference voltage is directly proportional to the ratio of resistances chosen multiplied by the voltage V+ across the ladder which in the present example is +8 V.

The resistance ladder not only provides the reference voltage for IC-5 but to the other 3 comparators of IC-5 not illustrated in FIG. 5. The other input to the comparator, IC-5, is the voltage between the electrodes of the detector which is directly proportional to the ratio of its resistance in series with R5, which in the present example is 33 K ohms, times V+.

When the voltage across any of the detector electrode pairs is less than the reference voltage the output of the corresponding comparator IC-5 is at +V which is logic level 1.

IC-2 provides a logical OR gate such that any combination of comparator outputs will enable the IC-4 which acts as a 1 Hz oscillator. The output of the oscillator at pin 3 is buffered by IC-3 a quad 2 input AND gate to switch T3 and T1 which respectively activate a buzzer A1 and "monitor alarm" a light A2 located on the instrument panel.

Panel mounted switch SW-1 allows the operator to select the output of each comparator IC-5, which if a logical 1, will gate the output of the oscillator IC-4 to switch T2 to activate the "monitor alert" light A3.

IC-6 is a voltage regulator which supplies the +8 V supply rail from either a +12 V or +24 V machinery power supply system.

Panel mounted switch SW-2 is a 5 position 2 pole switch which when in positions 2 to 5 selects the sensitivity and in position 1 is at a test position. Points A1, B1, C1 and D1 are connected to the non-earth electrode of the detector. In the test position the second pole of SW-2b provides the electrical equivalent of a short circuit to each of the four detectors at A1, B1, C1 and D1 respectively thereby enabling a check of the complete system.

It will be understood that while the apparatus has been described with particular reference to use in detecting metal particles in a lubricant, the detector also has application for use with other electrically non conductive fluids, for example, in detecting metal particles caused by cavitation of valve apparatus in pipelines for carrying such fluids.

Also, while in the preferred embodiment the detector takes the form of a plug adapted to be screwed into a part in other embodiments it may take the form of a probe.

Although in preferred embodiments the detector described is utilized in a circuit which provides a measure of the change in electrical resistance of a metal particle bridge spanning the electrodes of the detector, it will be understood that for some uses it would suffice merely to place a light or buzzer in series with the two electrodes of the detector and to connect that circuit to a current source so that on closure of the normally open circuit by a bridge of particles spanning between the electrodes, a visible or audible alarm is given.

It will further be understood that while in the embodiment described the resistance of the conductive path established by particles between the electrodes is measured by comparison with predetermined resistances, the resistance could be equally well measured by other means for example an ohm meter.

Similarly other parameters indicative of resistance could be measured for example a change in current. Also an a/c signal could be applied and a change in impedance measured.

The change could also be displayed by other means for example by a digital read out and could be fed to recorder or other means for measuring the rate of change of resistance over a period of time.

I claim:

1. Apparatus for detecting magnetisable electrically conductive particles in an electrically non-conductive fluid medium, including sensor means comprising: a plug shaped device having an axis and including means producing a magnetic flux in a flux path extending between two axially spaced apart electrode means electrically insulated one from the other and connectable to circuit means for signalling a condition in which an electrically conductive path is formed from one said electrode means to the other, the lines of force of said flux in said flux path extend substantially rectilinearly in an axial direction from one electrode to the other; and said means for producing the magnetic flux are ferromagnetic means for directing substantially the balance of said flux in a loop path said balance being substantially confined within said ferromagnetic means thereby substantially to prevent nonrectilinear portions of said flux from exerting an influence on magnetisable particles, if any, arranged between said electrode means.

2. Apparatus according to claim 1 further comprising a non-magnetic, non-electrically conductive, solid substance disposed between said axially spaced apart electrode means and occupying a partial volume of said rectilinear flux path whereby, in use of said apparatus, to deny access by magnetisable particles to said volume.

3. Apparatus according to claim 2 wherein the cross-sectional area of said rectilinear flux path which in use of said apparatus, is accessible to magnetisable particles is small in comparison with the total cross-sectional area of said rectilinear flux path between said electrodes.

4. Apparatus according to claim 1 wherein said sensor means comprise a plug having a hollow interior and a flat end wall made of a non-ferromagnetic electrically conductive metal, said plug being adapted for insertion through a transmission housing so as to form a seal therewith and so that the exterior of said end wall is in contact with a lubricant contained in said housing, two spaced apart magnetic pole faces, one of opposite polarity to the other, interior of said plug and disposed adjacent and facing said flat end wall, means mounting a ferromagnetic disc, said ferromagnetic means, exterior of said end wall, said disc overlying and parallel said pole faces and electrically insulated from said wall, means for electrically connecting said disc to said circuit, while sealing said interior from said lubricant, and means for electrically connecting said plug wall to said circuit.

5. Apparatus according to claim 4 wherein said ferromagnetic disc is spaced apart from said plug wall by a non-ferromagnetic non-conductive spacer having a slightly lesser diameter than said disc.

6. Apparatus for detecting magnetisable electrically conductive particles in an electrically non-conductive fluid medium, including sensor means comprising: a plug shaped device having an axis and including means producing a magnetic flux in a flux path extending between two axially spaced apart electrode means electrically insulated one from the other and connectable to circuit means for signalling a condition in which an electrically conductive path is formed from one said electrode means to the other, the lines of force of said flux in said flux path extend substantially rectilinearly in an axial direction from one electrode to the other: said means producing a magnetic flux comprises: two coplanar magnetic pole faces, one spaced laterally apart from, and of opposite polarity to, the other and a ferromagnetic body overlying both said faces and spaced apart therefrom, whereby a magnetic flux extends in a path from one said pole face to said ferromagnetic body, along said body and then to said other pole face, the lines of force of said flux extending substantially rectilinearly between said body and each said pole face.

7. Apparatus according to claim 6 wherein that face of said overlying body which is disposed towards said pole faces is of the same shape as a line circumscribing the outer boundaries of both said pole faces.

8. Apparatus according to claim 6 wherein said face of said overlying body is of substantially the same area as the area encompassed by said circumscribing line.

9. Apparatus according to claim 6 wherein said face of said overlying body is substantially parallel to each said pole face.

10. Apparatus according to claim 6 wherein said pole faces are pole faces of a single magnetic core.

11. Apparatus according to claim 6 wherein each said pole faces is a pole face of a permanent magnet.

12. Apparatus according to claim 6 wherein ferromagnetic body is also one of said electrode means.

13. Apparatus according to claim 12 wherein the other one of said electrode means is a non-ferromagnetic electrically conductive metal interposed between said pole faces and said overlying body and which in use of said apparatus also serves to isolate said pole faces from said fluid.

14. Apparatus according to claim 13 wherein said other electrode means is formed in the shape of a hollow plug adapted for insertion through a transmission housing so as to form a seal therewith; said plug containing said pole faces interior of said plug and disposed adjacent an end wall of said plug, the opposite side of said end wall being in contact with a lubricant contained by said transmission housing.

15. Apparatus according to claim 13 wherein the distance separating said first electrode means from said second electrode means is adjustable.

16. Apparatus according to claim 1 or claim 6 or claim 4 when connected to said circuit means and wherein said circuit means further comprise means for signalling a condition in which the electrical resistance of said electrically conductive path is below a predetermined value of electrical resistance.

17. Apparatus according to claim 16 wherein said circuit means comprise means for signalling a condition in which a parameter indicative of a current flow between said electrode means exceeds a threshold value.

18. Apparatus according to claim 16 wherein said circuit means comprise means for indicating a change in magnitude of current flow, if any, between said electrodes.

19. Apparatus according to claim 16 wherein said circuit means comprise means for comparing the electrical resistance of said electrically conductive path with one or more predetermined values of resistance.

* * * * *